Jan. 22, 1957 W. BADER 2,778,092
TOOL HOLDER
Filed Sept. 28, 1954
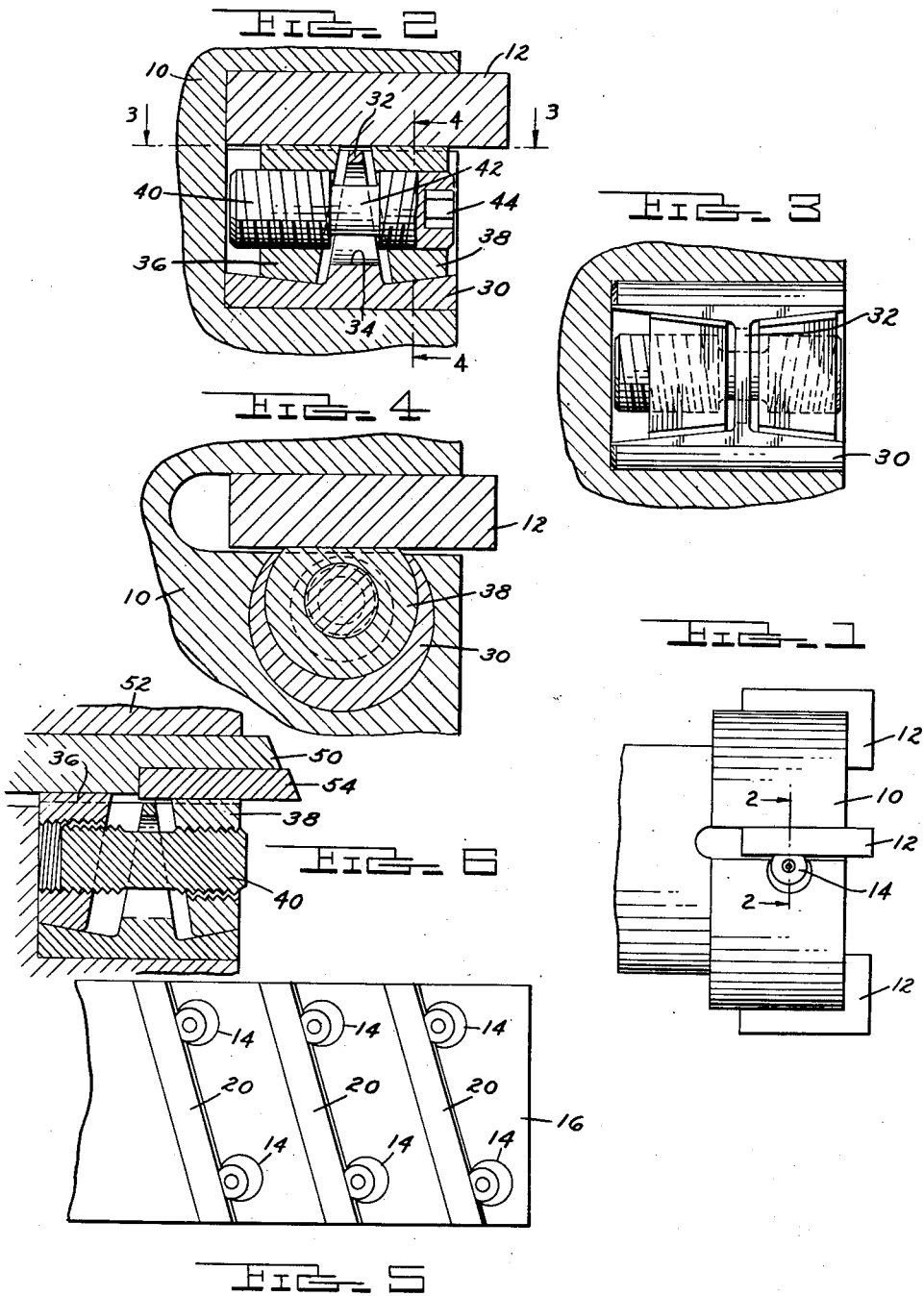
INVENTOR.
WILLIAM BADER
BY
ATTORNEYS United States Patent Office
2,778,092
Patented Jan. 22, 1957

2,778,092
TOOL HOLDER

William Bader, Ferndale, Mich., assignor to Wesson Tool Company, Ferndale, Mich., a corporation of Michigan Application September 28, 1954, Serial No. 458,861

3 Claims. (Cl. 29—105)

This invention relates to a locking cylinder particularly adapted for retaining tool bits and tool inserts in tool bodies.

Cylindrical or semi-cylindrical locking devices have been used for holding blades and other tools in position. Patent 1,736,273 illustrates one method wherein a wedge is pulled into a body by a screw threaded in the body and rotatable in the wedge, which is cylindrical on one side and flat or serrated on the other.

Other similar partially cylindrical wedges are actuated by a screw which urges the wedges outwardly of a containing body by reason of a threaded relationship, the screw bearing on the base of the hole in the body.

Still other devices of this kind utilize a partially cylindrical container or retainer insertable in a recess in a body and containing a wedge portion which acts through an opening in the container to exert force on a member such as a tool blade to be held in the body.

A double wedge type of lock for an inserted blade is shown in the Hart Patent 2,499,994, wherein wedges are cammed on inclined surfaces milled directly into a retaining body.

The present locking device is designed as an improved device over known constructions and briefly consists of a cylindrical retainer member having a crescent-shaped section with a flat on a pointed side of the crescent, the opening in said cylindrical container being divided by a septum wall. On either side of the division the inner walls of the container taper from the division upwardly and outwardly. Also, on either side of the wall with a dividing wall are slidably located wedge portions connected by an actuating screw which is threaded in each wedge portion and which passes freely through the wall portion of the container. The threads of the screw portion are designed so that one rotating movement of the screw will shift the wedge portion simultaneously in opposite directions, either toward or away from the septum divider.

There are numerous advantages that flow from the construction above recited, many of which will appear as the detailed description proceeds. One advantage is that there will be a two-point locking contact on any blade that is held with the device so that both ends will be tight and there will be a reduction in the tendency of the blade to chatter as it might if it is held tight at one point but not at another.

Another advantage is that the blade will always lock evenly. The wedges may rotate slightly to compensate for irregularities in the part being held, and there is a differential action in the sense that the wedge which is most easily shiftable will move until its contact is equal to that of the other wedge. Then, the wedge will move equally to provide an equal distribution of pressure on the part to be held.

Another advantage is that the device might be used in a blind hole, and should the hole for the retainer be oversize, there will be no locking action. The wedge will come out of the container, thus notifying the operator that no locking operation has taken place.

Other advantages and features of the device which flow from the construction and the co-operation with holding bodies and inserts will be evident in the following detailed description and claims.

Drawings accompany the invention, and the various views thereof may be briefly described as:

Figure 1, a view showing the lock combination in position in a tool holder.

Figure 2, a sectional view on line 2—2 of Figure 1, showing the various elements of the combination.

Figure 3, a sectional view of the parts on line 3—3 of Figure 2.

Figure 4, a sectional view of the parts on line 4—4 of Figure 2.

Figure 5, an illustration of a modified type of holding device on a rotary milling cutter.

Figure 6, a view showing, in an exaggerated dimensional presentation, the manner in which the locking wedges will compensate for varying dimensions in a device to be locked in position.

Referring to the drawings, Figure 1, a cutter body 10 is shown having cutting inserts 12 disposed in axial recesses therein held in place by the locking devices 14 of the present invention. In Figure 5, the cutter body 16 has blades 20 held in place by similar locking units 14. The locking unit is shown in section in Figures 2, 3 and 4. It consists of a retainer element 30, which has a cylindrical outer surface, with the exception of a chordal cut-off leaving a flat on one side. The retainer is recessed axially with off-center holes which enter each end of the retainer on an angle to the axis of the retainer, leaving a crescent-shaped body portion 30 with a central septum wall 32, said wall being provided with a perforation or axial opening 34. The recessing of the retainer provides circular surfaces which taper outwardly toward the ends of the device.

In the respective recesses of the retainer are wedge elements 36 and 38 having circular outer walls which conform to the walls of the recesses in the container and each having a flat side parallel to the axis of the retainer. These wedge elements are joined by a screw member 40 which has reverse threads on each end and a central portion 42 which lies within the opening 34 of the septum 32. The screw is slightly reduced in cross section at 42 and is provided with an Allen wrench opening 44 at one end.

Rotation of the screw will cause opposite movement of the wedge elements in the retainer 30, these elements moving outwardly or inwardly in an axial direction and due to the angle of the recesses moving also transversely of the axis of the retainer.

The manner in which the wedge elements clamp a cutter blade is shown in Figure 2. It will be seen that there will be a substantially equal pressure on both wedge elements when the screw 44 is actuated to move the wedge elements outwardly of their retaining recesses. If, due to dimension variations of the tool, one wedge had a loose fit with respect to the blade while the other wedge had a tight fit, a turning of the screw 44 would result in a compensating motion of the loose wedge until the forces being applied by the wedges have equalized.

It will be noted from the drawings that the septum wall 32 is located adjacent the center of the container between the ends thereof but is slightly spaced from the center to the right as viewed in Figure 2, for example. This provides a greater distance of travel for the unit 36 to prevent contact between the member 36 and the bottom of a blind hole should there be a need for more than the usual travel to a locking position.

In Figure 6, there is illustrated the manner in which the wedges compensate for variations in the surface of the blade 50 in the body 52. The blade is shown with a brazed tip 54 which has a slightly higher level than the surface of the blade proper. The wedges 36 and 38 can compensate for the difference in dimension by the amount of movement which each makes in the retainer. The slight compensating motion required on the part of the screw 40 can be absorbed by the play on the threads shown in exaggerated relation in Figure 6. The illustration in Figure 6 is an extreme case which would probably develop only rarely in actual operation, but it illustrates the manner in which the device can compensate for irregularities in the axial surfaces of the blades being held.

The figures also illustrate the manner in which the bearing or locking pressure on any particular blade is distributed over spaced areas, which insures a tight relationship of the blade in the body. Should there be taper in the blade, the lock will compensate length-wise in the manner shown in connection with Figure 6. Also, errors transversely of the blade can be compensated by a rocking of the wedging inserts.

I claim:

1. A double wedge lock for inserted blade cutters and the like to be received in a partially cylindrical hole in a cutter body adjacent an insert recess, which lock comprises a recess container element having a crescent-shaped cross section and a transverse, perforated septum between the ends thereof, the recesses of said container on opposite sides of said septum having convergently inclined circular back walls tapering outwardly to a smaller dimension, reversely inclined wedges of corresponding circular form seated in said recesses in end-to-end relation having wedge faces inclined to the axes of said container and complemental to the circular walls of said recesses, and a screw passing through the perforated septum out of contact with said container having a threaded relation with each of said wedges in a manner wherein rotation of said screw in any single direction will cause a transverse motion of said screw with respect to said container and an axial and opposite movement of said wedges with respect to each other in said container.

2. A device as defined in claim 1 in which the perforated septum serves as a positive seat for said wedges and also to reinforce the walls of the container and is positioned at a greater distance from one end of the container than the other to provide clearance for locking motion of one of said wedges.

3. A device as defined in claim 1 in which the recited septum has a transverse opening therein on an axis parallel to the axis of the container, said opening being large enough to pass the threaded ends of said screw, said parts being arranged in said container wherein a narrowed central portion of said screw coincides substantially with said opening in said septum to permit transverse motion of said screw within the container without contact therewith.

References Cited in the file of this patent

UNITED STATES PATENTS

| | | |
|---|---|---|
| 1,978,084 | Howard | Oct. 23, 1934 |
| 2,064,304 | Hall | Dec. 15, 1936 |
| 2,377,519 | Rich | June 5, 1945 |